United States Patent
Pfaff et al.

(10) Patent No.: US 10,797,621 B2
(45) Date of Patent: Oct. 6, 2020

(54) METHOD FOR OPERATING A SYSTEM WITH DRIVES, WHICH ARE MECHANICALLY COUPLED TOGETHER, AND WITH A HIGHER-LEVEL COMPUTER, AND SYSTEM

(71) Applicant: SEW-EURODRIVE GMBH & CO. KG, Bruchsal (DE)

(72) Inventors: Rainer Pfaff, Kraichtal (DE); Roland Brecht, Karlsbad (DE); Nico Reinacher, Dettenheim (DE)

(73) Assignee: SEW-EURODRIVE GMBH & CO. KG (DE)

( * ) Notice: Subject to any disclaimer, the term of this patent is extended or adjusted under 35 U.S.C. 154(b) by 0 days.

(21) Appl. No.: 16/327,117

(22) PCT Filed: Jul. 12, 2017

(86) PCT No.: PCT/EP2017/025202
§ 371 (c)(1),
(2) Date: Feb. 21, 2019

(87) PCT Pub. No.: WO2018/036660
PCT Pub. Date: Mar. 1, 2018

(65) Prior Publication Data
US 2019/0199249 A1    Jun. 27, 2019

(30) Foreign Application Priority Data
Aug. 22, 2016  (DE) ......................... 10 2016 010 043

(51) Int. Cl.
*H02P 5/56* (2016.01)
*H02P 5/747* (2006.01)
(Continued)

(52) U.S. Cl.
CPC .................. *H02P 5/56* (2016.02); *H02P 5/46* (2013.01); *H02P 5/747* (2013.01); *H02P 5/753* (2013.01)

(58) Field of Classification Search
None
See application file for complete search history.

(56) References Cited

U.S. PATENT DOCUMENTS 3,637,061 A  *  1/1972  Cortona ................... B41J 19/78
                                                        400/569
5,782,560 A  *  7/1998  Hatanaka ................ B29B 7/283
                                                        366/298
(Continued)

FOREIGN PATENT DOCUMENTS

DE    102010020598 A1    12/2010
DE    102012016770 A1     2/2014
(Continued)

OTHER PUBLICATIONS

International Search Report dated Nov. 27, 2017, in International Application No. PCT/EP2017/025202 (English-language translation).

*Primary Examiner* — Bentsu Ro
(74) *Attorney, Agent, or Firm* — Carter, DeLuca & Farrell LLP

(57) ABSTRACT

In a method for operating a system with drives, which are mechanically coupled to one another, and with a higher-level computer, which is connected to the drives with the aid of a data-bus connection, and a system, a respective actual torque value is determined in each drive and transmitted to the higher-level computer, in particular using a data-bus connection. The higher-level computer determines for each drive a setpoint torque value allocated to this drive, the higher-level computer has controllers, and one of the controllers is allocated, in particular biuniquely, to each drive.

(Continued)

The controller allocated to the respective drive controls the actual torque value of the respective drive to the setpoint torque value of the respective drive by determining a setpoint speed value allocated to the respective drive as the control value and transmits it to the respective drive, in particular with the aid of a data-bus connection. The respective drive has a controller in each case, to which the respective actual speed value, determined in the drive, of an electric motor of the drive is supplied and which controls this actual speed value to the respective setpoint speed value transmitted by the higher-level computer by setting the motor voltage or the motor current of the electric motor of the respective drive.

16 Claims, 2 Drawing Sheets

(51) Int. Cl.
*H02P 5/753* (2006.01)
*H02P 5/46* (2006.01)

(56) References Cited

U.S. PATENT DOCUMENTS

| | | | |
|---|---|---|---|
| 8,147,375 | B2 | 4/2012 | Sah |
| 9,071,187 | B2 | 6/2015 | Schulz et al. |
| 2005/0067984 | A1 | 3/2005 | Makinen et al. |
| 2009/0197731 | A1* | 8/2009 | Kobler .................. F16H 29/04 |
| | | | 475/166 |
| 2011/0018482 | A1 | 1/2011 | Purcell et al. |
| 2011/0177901 | A1* | 7/2011 | Blach .................... B29C 48/425 |
| | | | 475/5 |
| 2013/0199321 | A1* | 8/2013 | Oberle .................. F16D 7/021 |
| | | | 74/89.14 |
| 2016/0052423 | A1 | 2/2016 | Zhou et al. |

FOREIGN PATENT DOCUMENTS

| | | |
|---|---|---|
| DE | 102013002782 A1 | 5/2014 |
| DE | 102014115881 A1 | 5/2015 |
| JP | 2003219692 A | 7/2003 |

* cited by examiner

METHOD FOR OPERATING A SYSTEM WITH DRIVES, WHICH ARE MECHANICALLY COUPLED TOGETHER, AND WITH A HIGHER-LEVEL COMPUTER, AND SYSTEM

FIELD OF THE INVENTION

The present invention relates to a method for operating a system having drives, which are mechanically coupled to one another, in particular in a slip-free manner, and with a higher-level computer, and to a system.

BACKGROUND INFORMATION

Certain multi-axle drives have a plurality of drives. In this context, a drive is understood as a converter-supplied electric motor whose speed, i.e. rotational frequency, is controllable with the aid of the converter. Toward this end, the drive has a rotational speed acquisition, i.e. an acquisition of the rotational frequency of the shaft driven by the drive.

German Published Patent Application No. 10 2013 002 782 describes an axle drive having a device for reducing the mechanical play.

SUMMARY

Example embodiments of the present invention provide for jointly operating drives of a multi-axle drive, and in particular of achieving a simple communication in the process.

According to an example embodiment of the present invention, in a method is provided for operating a system having drives, which are mechanically coupled to one another, in particular drives coupled in a slip-free manner, and a higher-level computer, which is connected to the drives with the aid of a data-bus connection, an individual actual quantity value, i.e. an actual value of a physical quantity of the respective drive, is determined in each drive and transmitted to the higher-level computer, in particular with the aid of the data-bus connection, the higher-level computer determines for each drive a setpoint quantity value allocated to this respective drive, that is to say, a setpoint value of a physical quantity of the respective drive, the higher-level computer has controllers, and one of the controllers is allocated to each drive, in particular biuniquely, the controller allocated to the respective drive controls the actual quantity value of the respective drive to the setpoint quantity value of the respective drive in that it determines as the control value a setpoint speed value allocated to the respective drive and transmits it, in particular using a data-bus connection, to the respective drive, the respective drive has a controller, to which the respective actual speed value of an electric motor of the drive, determined in the drive, is supplied and which controls this respective actual speed value to the setpoint-speed value transmitted by the higher-level computer, in that it sets the motor voltage or the motor current of the electric motor of the respective drive.

This has the advantage that each drive has a shaft, which is driven by the converter-supplied electric motor of the drive, whose speed is controlled according to the specification of the higher-level computer, this speed specification being determined by the higher-level computer such that the torque of the drive is controlled to a desired setpoint value. This desired setpoint value is in turn determined as a function of the actual values of the torques of the drives.

The drives may be operated in the same manner—especially in contrast to the master-slave control in which the master is operated differently than the slaves. In addition, the same data-transmission rate is required for all drives in the method described herein. None of the drives requires a higher or a lower data-transmission rate than the other drives.

As a result, the drives of a multi-axle drive are able to be jointly operated, and a simple communication is achievable.

Instead of the quantity, some other quantity may be used, i.e. a switchover in particular occurs such that instead of the actual value of the physical quantity of the respective drive, the actual value of some other physical quantity of the respective drive is used, and that instead of the setpoint value of the physical quantity of the respective drive, the setpoint value of the other physical quantity of the respective drive is used. This is considered advantageous insofar as a better control is achievable. Depending on the individual application, a control method that has an improved control quality is therefore able to be used.

A switch may be made from the use of the quantity to the use of some other quantity, that is to say, the switchover particularly has the effect that instead of the actual value of the physical quality of the respective drive, the actual value of some other physical quality of the drive is used, and that instead of the setpoint value of the physical quantity of the respective drive, the setpoint value of the other physical quality of the respective drive is used. This offers the advantage that the best method may be employed for the respectively provided use, i.e. application.

The respective quantity may be the respective position or the respective torque of the respective drive. This is considered advantageous insofar as it is possible to select the better of two different control methods, i.e. the control method that is better for the respective application such as a machine or system.

The controllers of the drives and/or the controllers of the higher-level computer may have linear controllers in each case, in particular have a PI controller. This has the advantage of allowing for a simple realization.

The respective drive may have an electric motor, which is supplied by a respective converter of the drive, the respective converter setting the respective motor voltage. This offers the advantage that the rotational speed of the electric motor is controllable with the aid of the converter of the drive. Toward this end, the converter sets the motor voltage, the actual torque value of the drive being determined in the process. This actual torque value is transmitted to the higher-level computer and controlled there to the associated setpoint torque value by setting the setpoint speed value for the respective drive accordingly.

The shafts driven by the drives may be coupled with one another with the aid of a keyed connection, in particular using toothed wheels, or may be coupled in a nonpositive manner, in particular using a frictional connection. This has the advantage that no twisting forces build up since in the event that one of the drives "runs ahead" of one of the drives, its torque increases and the higher-level computer then reduces the setpoint speed-value specification accordingly.

No master-slave control may take place in the system. This offers the advantage that no a cross-communication of the drives among one another is required.

According to an example embodiment of the present invention, in a method for operating a system having drives and a higher-level computer, each drive has a converter-supplied electric motor, and the respective drive includes a device for acquiring a speed, in particular a respective rotational frequency of the rotor of the electric motor, the respective converter has a controller in each case, which controls the respective actual speed value to a respective setpoint speed value by appropriately setting the motor voltage of the individual electric motor, the respective actual torque value is determined in the drive and transmitted to the higher-level computer with the aid of the data-bus connection, a controller of the higher-level computer determines the respective setpoint speed value as the control value by controlling the respective actual torque value to a respective setpoint torque value, the respective setpoint torque value is determined as a function of the actual torque values, and in particular, the respective setpoint torque values correspond to the averaged value of all actual torque values, or the respective setpoint torque values correspond to a respective share in the sum of all actual torque values.

This has the advantage that the distribution of the data-transmission rate between the higher-level computer and the respective drive has a uniform characteristic. In addition, no cross-communication between the drives is required. A particularly uncomplicated configuration is therefore achievable.

According to an example embodiment of the present invention, in a system for carrying out the aforementioned method, no master-slave control is carried out or is able to be carried out. This is considered advantageous insofar as all drives are equal, in particular also with regard to the data-transmission rate required for the control, and their respective share in the data flow as a whole.

In contrast to the master-slave control, no cross-communication may occur within the converters described herein; instead, all converters are controlled by the higher-level control in equal measure, which results in an even data-transmission rate, in particular also an evenly distributed data-transmission rate.

The higher-level computer may have a switchover device, especially for the switchover between the use of the first quantity and the other quantity, in particular in the control method. This has the advantage that a switch is possible between the use of the two different quantities, such as the torque and position, in particular during an ongoing operation.

Further features and aspects of example embodiments of the present invention are will now be described in greater detail below with reference to the appended Figures.

DETAILED DESCRIPTION

Figure 1:
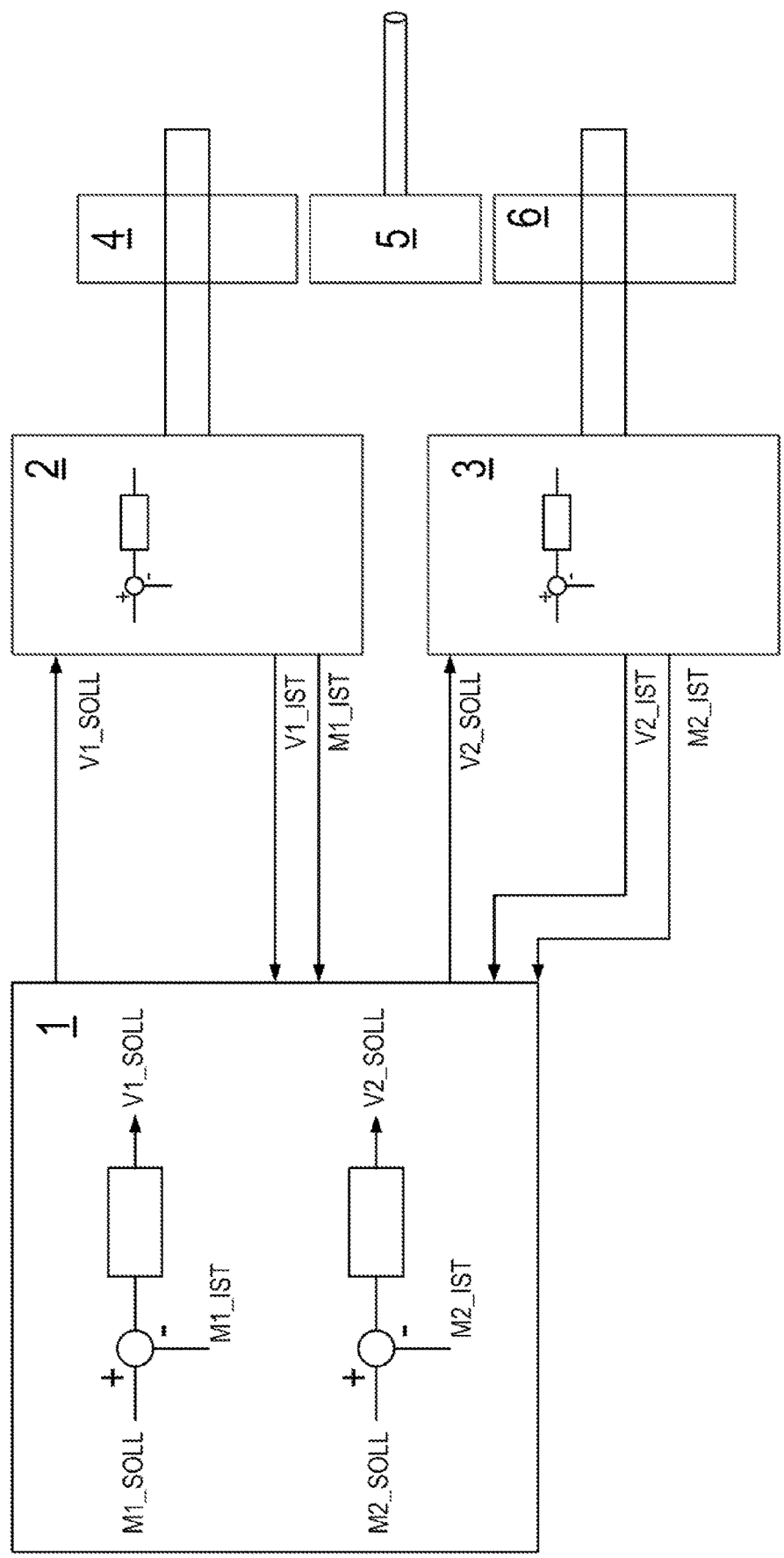
FIG. 1 schematically illustrates an example embodiment of the present invention.

In FIG. 1, an exemplary embodiment according to the present invention is schematically illustrated.

Two drives (2, 3) are provided in mechanically coupled form.

First drive 2 has a converter-supplied electric motor, which drives a first toothed wheel 4, whose tooth system is meshing with the tooth system of a sun gear 5, i.e. in particular a center gear, on the output end, either directly or via a gear mechanism.

The tooth system of sun gear 5 is in turn meshing with tooth system of a second toothed wheel 6, which is driven by a converter-supplied electric motor of a second drive 3, either directly or via a gear mechanism.

Each converter has a controller unit.

The controller unit of first drive 2 controls actual speed value V1_Actual to a setpoint speed value V1_Setpoint by appropriately setting a control value, in particular the motor voltage for the electric motor of first drive 2. In addition, actual torque value M1_Actual is determined by the controller unit of first drive 2 and transmitted via a data bus to a higher-level computer 1, i.e. a central control. In the same manner, actual speed value V1_Actual is transmitted to the central control. From the central control, setpoint speed value V1_Setpoint is transmitted and predefined to the first drive via the data bus.

In the same manner, the controller unit of second drive 3 controls actual speed value V2_Actual to a setpoint speed value V2_Setpoint by appropriately setting a control value, in particular the motor voltage for the electric motor of second drive 3. In addition, the controller unit of first drive 2 determines actual torque value M1_Actual and transmits it via a data bus to a higher-level computer 1, i.e. a central control. Actual speed value V1_Actual is also transmitted to the central control. Setpoint speed value V1_Setpoint is transmitted and predefined to the first drive by the central control via the data bus.

Higher-level computer 1 has controllers allocated to the respective drives (2, 3).

A first one of these controllers regulates actual torque value M1_Actual of first drive M1_Actual to a setpoint torque value M1_Setpoint by setting setpoint speed value V1_Setpoint as the control value.

A second of these controllers regulates actual torque value M2_Actual of second drive M2_Actual to a setpoint torque value M2_Setpoint by setting setpoint speed value V2_Setpoint as the control value.

The central computer determines the setpoint torque values (M1_Setpoint, M2_Setpoint) as a function of actual torque values (M1_Actual, M2_Actual), for example.

In the illustrated exemplary embodiment, an equal distribution is the goal, which means that the following applies:

$$M1\_Setpoint=(M1\_Actual+M2\_Actual)/2$$

$$M2\_Setpoint=(M1\_Actual+M2\_Actual)/2$$

In other exemplary embodiments, the setpoint torque values of the drives are determined using other functions, such as $$M1\_Setpoint=a*M1\_Actual+b*M2\_Actual$$

$$M2\_Setpoint=c*M1\_Actual+d*M2\_Actual$$

where a, b, c, d are proportional factors, in particular a respective rational number between 0 and 1.

Alternatively, it is also possible to use a general function in each case, according to:

$$M1\_Setpoint=f1(M1\_Ist, M2\_Actual)$$

$$M2\_Setpoint=f2(M1\_Ist, M2\_Actual)$$

where f1 and f2 are functions in each case.

In other exemplary embodiments, a nonpositive or some other type of mechanical coupling of the drives is provided instead of the keyed coupling of the drives.

In addition, it is also possible to use a larger number of drives, the control then having a cascading arrangement. It is thus the case that a setpoint torque value allocated to the respective drive is determined in higher-level computer 1 according to $$M1\_Setpoint = f1(M1\_Actual, M2\_Actual, \ldots Mi\_Actual, \ldots, MN\_Actual)$$

$$M2\_Setpoint = f2(M1\_Actual, M2\_Actual, \ldots Mi\_Actual, \ldots, MN\_Actual)$$

$$\ldots$$

$$Mi\_Setpoint = fi(M1\_Actual, M2\_Actual, \ldots Mi\_Actual, \ldots, MN\_Actual)$$

$$\ldots$$

$$MN\_Setpoint = fN(M1\_Actual, M2\_Actual, \ldots Mi\_Actual, \ldots, MN\_Actual)$$

where the drives are numbered by the running variable i, which runs from 1 to N.

Using a respective controller of higher-level computer 1, a respective setpoint speed value is determined from the setpoint torque-value specification and the respective actual torque value of the respective drive, which is transmitted to the individual drive, whose controller controls its respective actual speed value to the setpoint speed value transmitted by higher-level computer 1.

In other one further exemplary embodiments, instead of the quantity "torque" mentioned in FIG. 1, some other physical quantity is used such as the "position", i.e. in particular the location, of the respective drive.

Each drive has a position-acquisition sensor for this purpose. In the case of rotative electric motors, a conventional angle sensor is installed in or on the electric motor of the drive or added on. The acquired angle values represent the actual values of the position.

Figure 2:
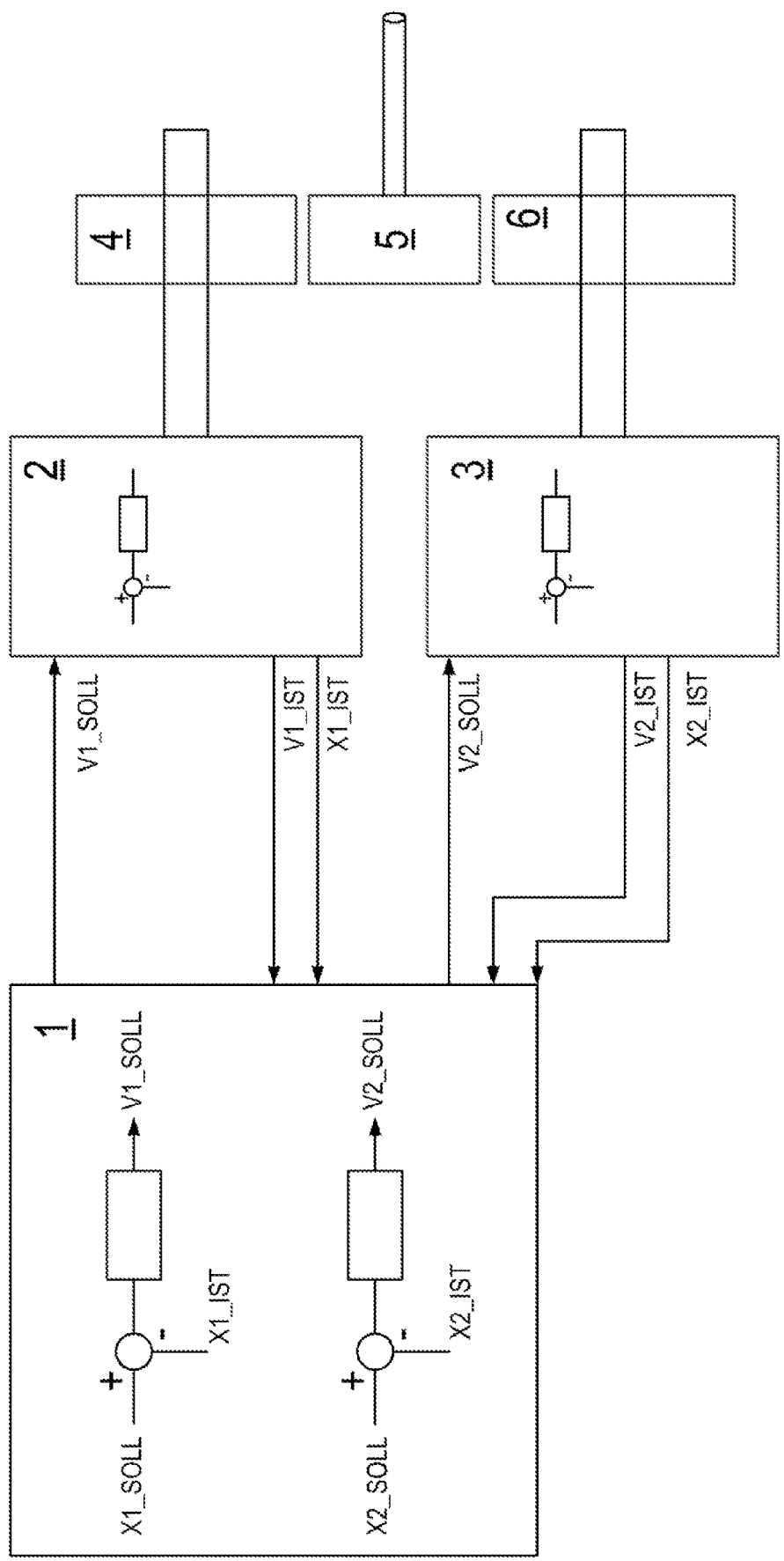
FIG. 2 schematically illustrates an example embodiment of the present invention.

As illustrated in FIG. 2, instantaneously detected position values X1_ACTUAL of first drive 2 are transmitted by first drive 2 to higher-level computer 1 and conveyed to a controller, which determines the setpoint speed value V1_Setpoint for the first drive.

In the same manner, instantaneously acquired position values X2_ACTUAL of second drive 3 are transmitted by second drive 3 to higher-level computer 1 and conveyed to a further controller, which determines setpoint speed value V2_Setpoint for the second drive.

The setpoint value X1_SETPOINT for the first controller is determined as a function of the two position values X1_ACTUAL and X2_ACTUAL. Accordingly, setpoint value X2_SETPOINT for the second controller is determined as a function of the actual position values X1_ACTUAL and X2_ACTUAL of the two drives (2, 3). Appropriate formulas such as those mentioned earlier for the torque may be used for this purpose.

In addition, an application to a plurality of drives is achievable in a similar manner.

In further exemplary embodiments, a device for switching between the embodiment according to FIG. 1 and the embodiment according to FIG. 2 is available in the higher-level control.

Therefore, it is optionally possible to provide a higher-level position control or a higher-level torque control in higher-level computer 1. In other words, the switchover has the effect that instead of the actual torque values supplied by the drives (2, 3) to higher-level computer 1, actual location values, i.e. actual position values, are taken into account in the higher-level control, or vice versa. In any event, however, the higher-level controls determine the setpoint speed-value specifications for the drives (2, 3).

The switchover between the two control methods during an ongoing operation is particularly advantageous.

LIST OF REFERENCE CHARACTERS

1 higher-level computer
2 first drive
3 second drive
4 first toothed wheel
5 sun gear
6 second geared wheel
M1_Setpoint setpoint torque value for the first drive
M2_Setpoint setpoint torque value for the second drive
V1_Setpoint setpoint speed value for the first drive
V2_Setpoint setpoint speed value for the second drive
M1_Actual actual torque value for the first drive
M2_Actual actual torque value for the second drive
V1_Actual actual speed value for the first drive
V2_Actual actual speed value for the second drive

The invention claimed is:

1. A method for operating a system having drives, that are mechanically coupled, and a higher-level computer, connected to the drives via a data-bus connection, the higher-level computer including controllers, each controller being biuniquely allocated to a respective drive, comprising:
determining, in each drive, a respective actual quantity value;
transmitting the respective actual quantity value to the higher-level computer via the data-bus connection;
determining, by the higher-level computer, for each drive, a setpoint quantity value allocated to the respective drive;
controlling, by the controller allocated to the respective drive, the actual quantity value of the respective drive to the setpoint quantity value of the respective drive, the controller determining as a control value a setpoint speed value allocated to the respective drive and transmitting the control value to the respective drive via the data-bus connection;
supplying, to an individual controller of the respective drive, the respective actual speed value of an electric motor of the drive, determined in the drive;
controlling, by the individual controller of the respective drive, the respective actual speed value to the respective setpoint-speed value transmitted by the higher-level computer to set a motor voltage and/or a motor current of the electric motor of the respective drive.

2. The method according to claim 1, wherein the drives are coupled in a slip-free manner.

3. The method according to claim 1, wherein the respective actual quantity value includes an actual value of a physical quantity of the respective drive.

4. The method according to claim 3, further comprising:
switching between the actual value of the physical quantity of the respective drive and an actual value of another physical quantity of the respective drive so that, instead of the setpoint value of the physical quantity of the respective drive, a setpoint value of the other physical quantity of the respective drive is used; and/or
switching from the use of the quantity to the use of another quantity, so that, instead of the actual value of the physical quantity of the respective drive, the actual value of the other physical quantity of the respective drive is used, and that instead of the setpoint value of the physical quantity of the respective drive, the setpoint value of the other physical quantity of the drive is used.

5. The method according to claim 1, wherein the respective quantity includes a respective position and/or a respective torque of the individual drive.

6. The method according to claim 1, wherein the controllers of the drives and/or the controllers of the higher-level computer include linear controllers and/or PI controllers.

7. The method according to claim 1, wherein the respective drive includes an electric motor supplied by a respective converter of the drive, the respective converter setting a respective motor voltage.

8. The method according to claim 1, wherein shafts driven by the drives are coupled to one another in a keyed manner, are coupled to one another in a keyed manner with the aid of toothed wheels, are coupled in a nonpositive manner, and/or are coupled in a nonpositive manner via a frictional connection.

9. The method according to claim 1, wherein no master-slave control is performed in the system.

10. The method according to claim 1, wherein the system includes more than two drives.

11. A method for operating a system having drives and a higher-level computer, each drive including a converter-supplied electric motor and acquisition device adapted to acquire a speed and/or a rotational frequency of a rotor of the electric motor, each converter including a controller adapted to control a respective actual speed value to a respective setpoint speed value by setting a motor voltage of the respective electric motor accordingly, comprising:
  determining, in the drive, a respective actual quantity value;
  transmitting the actual quantity value to the higher-level computer via data-bus connection; and
  determining, by a controller of the higher-level computer, the respective setpoint-speed value as a control value by controlling the respective actual quantity value to a respective setpoint quantity value, the respective setpoint quantity value being determined as a function of the actual quantity values;
  wherein the respective setpoint quantity values correspond to an averaged value of all actual quantity values and/or the respective setpoint quantity values correspond to a respective share in a sum of all actual quantity values.

12. The method according to claim 11, further comprising switching between the quantity and another quantity, so that instead of the actual value of the physical quantity of the respective drive, the actual value of the other physical quantity of the respective drive is used, and that instead of the setpoint value of the physical quantity of the respective drive, the setpoint value of the other physical quantity of the respective drive is used; and/or
  switching between the quantity and another quantity, so that, instead of the actual value of the physical quantity of the respective drive, the actual value of the other physical quantity of the respective drive is used, and that instead of the setpoint value of the physical quantity of the respective drive, the setpoint value of the other physical quantity of the respective drive is used.

13. The method according to claim 11, wherein the respective quantity includes a respective position and/or a respective torque of the individual drive.

14. A system, comprising:
  drives, that are mechanically coupled; and
  a higher-level computer, connected to the drives via a data-bus connection, the higher-level computer including controllers, each controller being biuniquely allocated to a respective drive;
  wherein the system is adapted to perform a method including:
    determining, in each drive, a respective actual quantity value;
    transmitting the respective actual quantity value to the higher-level computer via the data-bus connection;
    determining, by the higher-level computer, for each drive, a setpoint quantity value allocated to the respective drive;
    controlling, by the controller allocated to the respective drive, the actual quantity value of the respective drive to the setpoint quantity value of the respective drive, the controller determining as a control value a setpoint speed value allocated to the respective drive and transmitting the control value to the respective drive via the data-bus connection;
    supplying, to an individual controller of the respective drive, the respective actual speed value of an electric motor of the drive, determined in the drive;
    controlling, by the individual controller of the respective drive, the respective actual speed value to the respective setpoint-speed value transmitted by the higher-level computer to set a motor voltage and/or a motor current of the electric motor of the respective drive; and
  wherein no master-slave control is performed or performable by the system.

15. The system according to claim 14, wherein the higher-level computer include a switch device adapted to switch between use of the quantity and another quantity.

16. A system, comprising: method for operating a system having drives and a higher-level computer, each drive including a converter-supplied electric motor and acquisition device adapted to acquire a speed and/or a rotational frequency of a rotor of the electric motor, each converter including a controller adapted to control a respective actual speed value to a respective setpoint speed value by setting a motor voltage of the respective electric motor accordingly, comprising:
  determining, in the drive, a respective actual quantity value;
  transmitting the actual quantity value to the higher-level computer via data-bus connection; and
  determining, by a controller of the higher-level computer, the respective setpoint-speed value as a control value by controlling the respective actual quantity value to a respective setpoint quantity value, the respective setpoint quantity value being determined as a function of the actual quantity values;
  wherein the respective setpoint quantity values correspond to an averaged value of all actual quantity values and/or the respective setpoint quantity values correspond to a respective share in a sum of all actual quantity values.

* * * * *